US010657041B2

(12) United States Patent
Doh et al.

(10) Patent No.: US 10,657,041 B2
(45) Date of Patent: May 19, 2020

(54) DATA MANAGEMENT METHOD AND STORAGE DEVICE PERFORMING THE SAME

(71) Applicant: SAMSUNG ELECTRONICS CO., LTD., Suwon-si, Gyeonggi-do (KR)

(72) Inventors: In-Hwan Doh, Seoul (KR); Joo-Young Hwang, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 113 days.

(21) Appl. No.: 16/037,169

(22) Filed: Jul. 17, 2018

(65) Prior Publication Data

US 2019/0163621 A1 May 30, 2019

(30) Foreign Application Priority Data

Nov. 24, 2017 (KR) .................. 10-2017-0158832

(51) Int. Cl.
*G06F 12/12* (2016.01)
*G06F 12/02* (2006.01)
*G06F 3/06* (2006.01)

(52) U.S. Cl.
CPC .......... *G06F 12/0246* (2013.01); *G06F 3/064* (2013.01); *G06F 3/065* (2013.01); *G06F 3/0608* (2013.01); *G06F 3/0652* (2013.01); *G06F 3/0679* (2013.01); *G06F 2212/7201* (2013.01); *G06F 2212/7205* (2013.01)

(58) Field of Classification Search
CPC ............................ G06F 12/0246; G06F 3/0652

USPC ........................................................ 711/103
See application file for complete search history.

(56) References Cited

U.S. PATENT DOCUMENTS

| | | | |
|---|---|---|---|
| 6,826,563 B1 * | 11/2004 | Chong | ................ G06F 16/2237 707/745 |
| 8,239,639 B2 | 8/2012 | Sinclair | |
| 8,407,402 B2 | 3/2013 | Yano et al. | |
| 8,473,669 B2 | 6/2013 | Sinclair | |
| 8,516,203 B2 | 8/2013 | Gorobets | |
| 8,762,627 B2 | 6/2014 | Sela | |
| 9,323,667 B2 | 4/2016 | Bennett | |
| 9,383,926 B2 | 7/2016 | Law | |
| 9,542,118 B1 | 1/2017 | Lercari et al. | |
| 9,582,416 B2 | 2/2017 | Yen | |
| 9,678,966 B2 | 6/2017 | Ki et al. | |
| 9,727,454 B2 | 8/2017 | Kuzmin et al. | |
| 10,110,667 B2 * | 10/2018 | Geist | ...................... H04L 51/30 |
| 2002/0150300 A1 * | 10/2002 | Lee | ......................... G06K 9/72 382/229 |
| 2017/0060448 A1 | 3/2017 | Schnarch et al. | |

* cited by examiner

*Primary Examiner* — Jae U Yu
(74) *Attorney, Agent, or Firm* — Volentine, Whitt & Francos, PLLC

(57) ABSTRACT

In a data management method for a storage device, the storage device includes a nonvolatile memory device including a plurality of memory blocks. A TRIM-after-COPY command is received from an external host such that a data compaction operation is performed on a first storage region. Valid data stored in the first storage region are internally copied into a second storage region based on the TRIM-after-COPY command. A TRIM operation is performed based on the TRIM-after-COPY command to update a logical-to-physical address mapping table and a valid page bitmap.

19 Claims, 15 Drawing Sheets

FIG. 3B
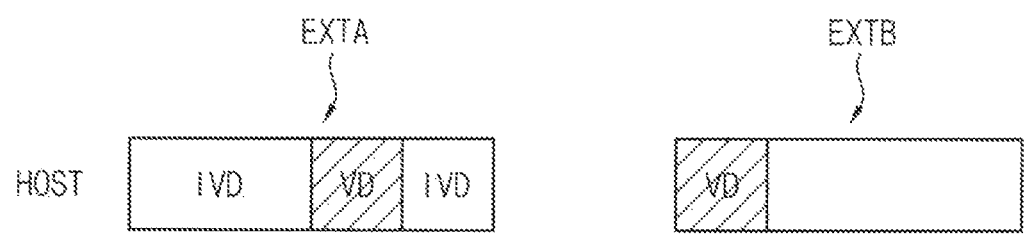
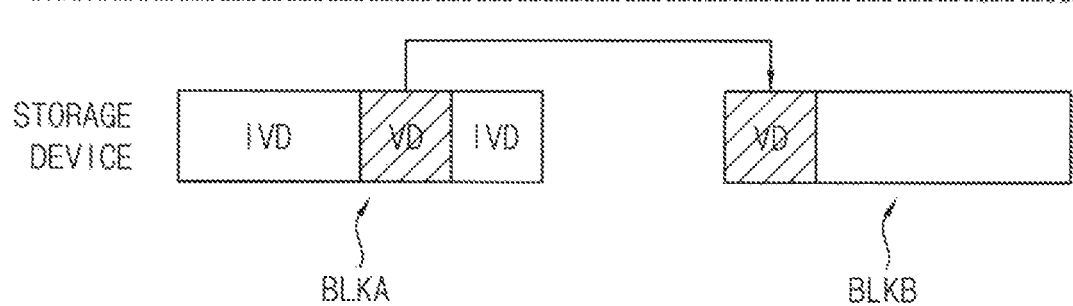

FIG. 3C
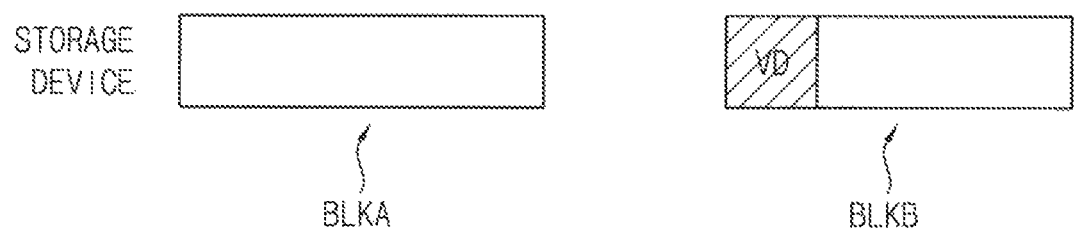
FIG. 4
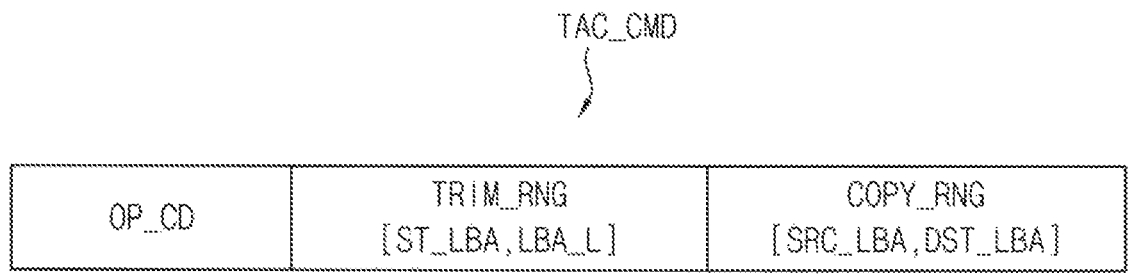

DATA MANAGEMENT METHOD AND STORAGE DEVICE PERFORMING THE SAME

CROSS-REFERENCE TO RELATED APPLICATION

This application claims priority under 35 USC § 119 to Korean Patent Application No. 10-2017-0158832, filed on Nov. 24, 2017 in the Korean Intellectual Property Office (KIPO), the contents of which are herein incorporated by reference in their entirety.

BACKGROUND

1. Technical Field

Example embodiments relate generally to storage devices, and more particularly to data management methods and storage devices performing the data management methods.

2. Description of the Related Art

Certain types of data storage devices comprise one or more semiconductor memory devices. Examples of such data storage devices include solid state drives (SSDs). These types of data storage devices may enjoy various design and performance advantages over conventional hard disk drives (HDDs). Examples of potential advantages include the absence of moving mechanical parts, higher data access speeds, improved stability and durability, and low power consumption, to name but a few. These types of data storage devices usually include nonvolatile memory devices, e.g., flash memories. In a flash memory of an SSD, if it is required to update previous data that is already written into the flash memory, the previous data in a storage space of the flash memory may be invalidated, and updated data may be written into another storage space of the flash memory. Further, in an SSD, as the amount of invalid data increases, a data compaction operation or a garbage collection operation should be performed for collecting used storage space that stores the invalid data (e.g., for changing the used storage space to a free storage space).

SUMMARY

At least one example embodiment of the present disclosure provides a data management method capable of efficiently controlling and/or optimizing the data.

At least one example embodiment of the present disclosure provides a storage device capable of efficiently controlling and/or optimizing data based on the data management method.

According to example embodiments, in a data management method for a storage device, the storage device includes a nonvolatile memory device having a plurality of memory blocks. A TRIM-after-COPY command is received from an external host such that a data compaction operation is performed on a first storage region. Valid data stored in the first storage region are internally copied into a second storage region based on the TRIM-after-COPY command A TRIM operation is performed based on the TRIM-after-COPY command to update a logical-to-physical address mapping table and a valid page bitmap.

According to example embodiments, in a data management method for a storage device, the storage device includes a nonvolatile memory device including a plurality of memory blocks. A copy command is received from an external host such that a data copy operation is performed on a first storage region. Valid data stored in the first storage region are internally copied into a second storage region based on the copy command Logical addresses and physical addresses of the valid data are changed at once as the data copy operation for the valid data is performed.

According to example embodiments, a storage device includes a nonvolatile memory device and a storage controller. The nonvolatile memory device includes a plurality of memory blocks. The storage controller controls the nonvolatile memory device. The storage controller receives a TRIM-after-COPY command from an external host such that a data compaction operation is performed on a first storage region. Valid data stored in the first storage region are internally copied into a second storage region based on the TRIM-after-COPY command The storage controller performs a TRIM operation based on the TRIM-after-COPY command to update a logical-to-physical address mapping table and a valid page bitmap.

According to example embodiments, a storage device includes a nonvolatile memory having memory blocks and a storage controller. In response to receiving a command from an external host, the storage controller: (1) controls the nonvolatile memory to internally copy valid data from a first of the memory blocks to a second of the memory blocks, without communicating the valid data to the host, and (2) updates a logical-to-physical address mapping table to reflect changes to physical addresses of the valid data created by copying the valid data from the first memory block to the second memory block.

In the data management method and the storage device according to example embodiments, an efficiency of the data compaction operation may be improved or enhanced based on the TRIM-after-COPY command that represents a single command in which the data read/write commands and the TRIM command are combined or integrated with each other. For example, in the storage device in which stored data are managed based on a log-structured scheme, the valid data may be internally copied based on the TRIM-after-COPY command, and at the same time, the logical-to-physical address mapping table and the valid bitmap may be updated. Further, the logical-to-physical address mapping table and the valid page bitmap may be updated at once or in a batch (e.g., in units of block) based on the information of the TRIM sequential logical block address range that represents the target of the TRIM operation. Accordingly, software executed by the host may have relatively improved or enhanced performance and reduced processing cost, an interface between the host and the storage device may have relatively reduced bandwidth and processing cost, and the TRIM operation may be efficiently performed in the storage device.

In addition, in the data management method according to example embodiments, the data copy operation may be efficiently performed based on the copy command that represents a single command in which the data read and write commands are combined or integrated with each other.

BRIEF DESCRIPTION OF THE DRAWINGS

Illustrative, non-limiting example embodiments will be more clearly understood from the following detailed description taken in conjunction with the accompanying drawings.

FIGS. 2, 3A, 3B and 3C are diagrams for describing a data management method according to example embodiments.

FIG. 4 is a diagram illustrating an example of a TRIM-after-COPY command that is used in a data management method according to example embodiments.

DETAILED DESCRIPTION OF THE EMBODIMENTS

Figure 1:
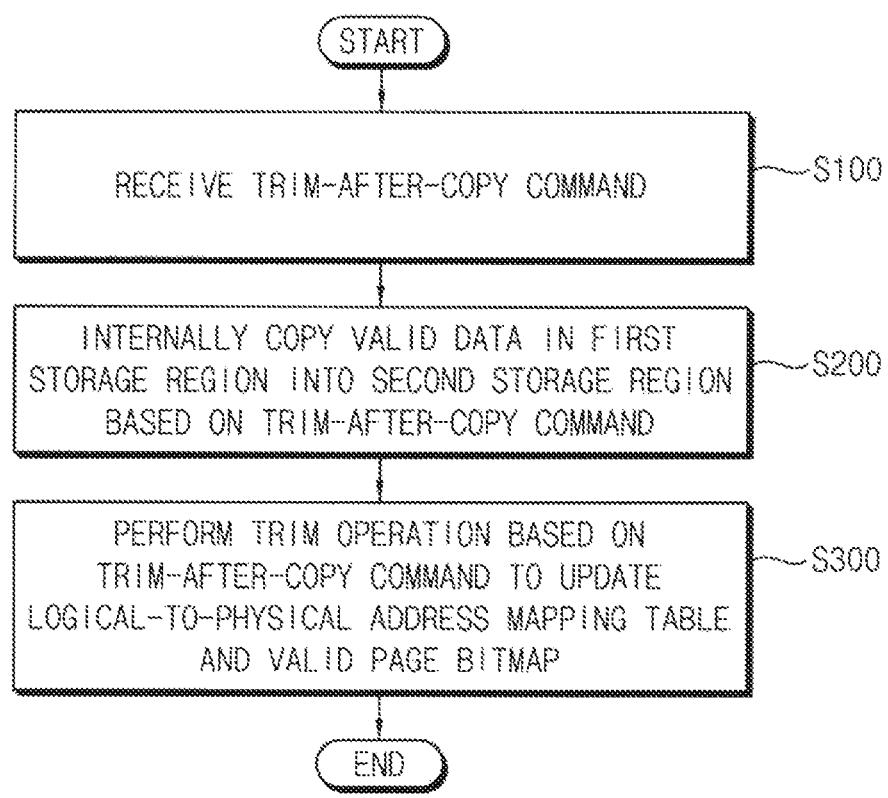
FIG. 1 is a flow chart illustrating a data management method according to example embodiments.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

FIG. 1 is a flow chart illustrating a data management method according to example embodiments.

Referring to FIG. 1, a data management method according to example embodiments is executed by a storage device that includes a nonvolatile memory device including a plurality of memory blocks.

A TRIM-after-COPY command is received from an external host such that a data compaction operation is performed on a first storage region (step S100). The data compaction operation represents an operation for collecting or reclaiming used storage space (e.g., the first storage region) that stores invalid data (e.g., for changing the used storage space to a free storage space) when the amount of the invalid data increases. The first storage region that is a target of the data compaction operation may be selected or determined by the external host. The TRIM-after-COPY command may represent a single command in which a data read command, a data write command and a TRIM command are combined or integrated with each other, and will be described in detail with reference to FIG. 4.

Valid data stored in the first storage region are internally copied into a second storage region based on the TRIM-after-COPY command (step S200). An operation of internally copying the valid data (e.g., an internal data copy operation or simply a data copy operation) may represent an operation in which the valid data are directly copied from the first storage region into the second storage region in the storage device without going through the external host. For example, the first storage region and the second storage region may be logically and physically different from each other. The data copy operation for the valid data will be described in detail with reference to FIGS. 3A and 3B.

A TRIM (nota bene, while this term is usually capitalized, it is not an abbreviation or acronym.) operation is performed based on the TRIM-after-COPY command to update a logical-to-physical address mapping table and a valid page bitmap (step S300). The TRIM operation represents an operation in which a host (e.g., the external host) processes only metadata for a corresponding file when a deletion request for a specific file is inputted from a user. In this case, since only metadata of the host is processed without substantially deleting data stored in the storage device, the user may recognize a deletion operation for a corresponding file as quickly being performed. The TRIM operation will be described in detail with reference to FIG. 3C.

An operation of updating the logical-to-physical address mapping table and the valid page bitmap in step S300 may represent an operation in which logical addresses and physical addresses of the copied valid data are updated. In other words, the logical addresses and the physical addresses of the valid data may be changed at once or in a batch as the data copy operation for the valid data is performed.

In some example embodiments, the storage device may be configured to operate based on a multi-stream scheme in which a plurality of data written into the plurality of memory blocks are classified into and managed by a plurality of streams and data with a single stream are written into a single memory block. In other words, one memory block included in the storage device may only store data with the same stream.

Generally, specific types of data may tend to have similar data lifetimes or lifecycles, and may tend to be invalidated at similar time points. When the multi-stream scheme is employed, data that have the similar data lifetimes or lifecycles and are invalidated at the similar time points may be set to have the same stream, may be stored into the same memory block physically, may be validated during a similar or the same time interval, and may be invalidated at once, thereby improving and enhancing performance and durability of the storage device. The multi-stream scheme may be referred to as a stream directives scheme, and is standardized.

In other example embodiments, the storage device may be configured to operate based on one of various schemes in which an alignment or arrangement of data extents in the host and an alignment or arrangement of memory blocks in the storage device are matched with each other, and will be described in detail.

In the data management method according to example embodiments, the data compaction operation may be efficiently performed based on the TRIM-after-COPY command that represents a single command in which the data read/write commands and the TRIM command are combined or integrated with each other. Accordingly, the storage device may be efficiently managed or controlled with optimized or best performance FIGS. 2, 3A, 3B and 3C are diagrams for describing a data management method according to example embodiments.

Figure 2:
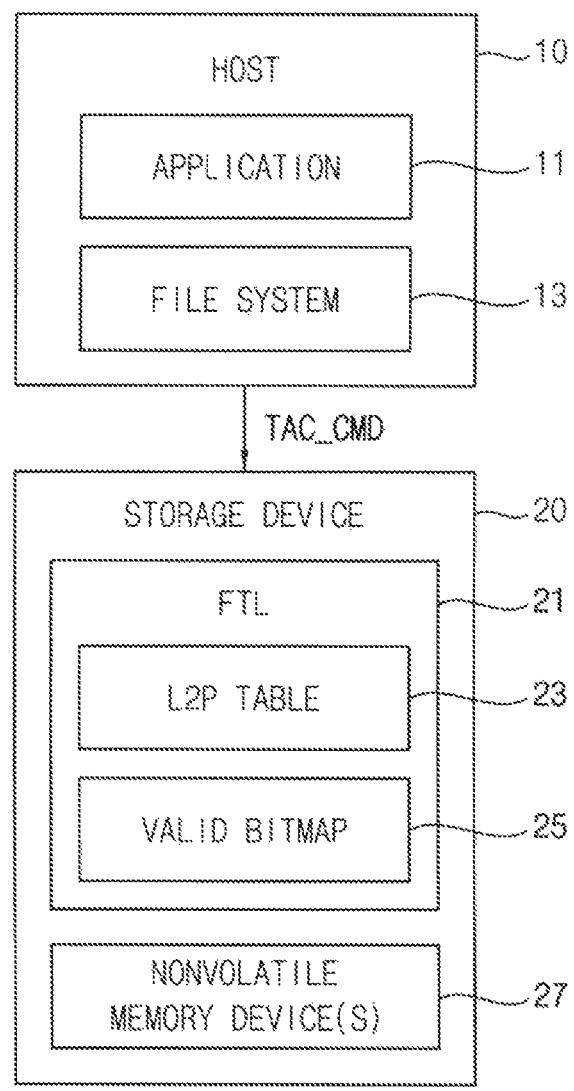

Referring to FIG. 2, the data management method according to example embodiments is executed or performed by a host 10 and a storage device 20. FIG. 2 conceptually illustrates a software hierarchical structure of the host 10 and the storage device 20, and a hardware structure of the host 10 and the storage device 20 will be described with reference to FIGS. 10 through 13.

The host 10 may include an application 11 and a file system 13, and the storage device 20 may include a flash translation layer (FTL) 21 and at least one nonvolatile memory device 27. The application 11 and the file system 13 of the host 10 may be referred to as a high level. The flash translation layer 21 and the nonvolatile memory device 27 may be referred to as a low level.

The application 11 may be an application software program that is executed on an operating system (OS). For example, the application 11 has been programmed to aid in generating, copying and deleting a file. The file system 13 may manage a file used by the host 10. For example, the file system 13 may manage the file based on a log-structured scheme in which data and metadata are written sequentially to a circular buffer, called a log.

The flash translation layer 21 may translate a logical address provided from the host 10 into a physical address in the nonvolatile memory device 27, and may manage data stored in the nonvolatile memory device 27. The nonvolatile memory device 27 may perform data read/write/erase operations, or the like. As will be described with reference to FIG. 10, the nonvolatile memory device 27 may include a plurality of memory blocks, and each memory block may include a plurality of pages.

The flash translation layer 21 may include a logical-to-physical address mapping table (L2P TABLE or simply L2PT) 23 that is used for translating the logical address into the physical address, and a valid bitmap 25 that represents bitmaps for valid pages in each memory block. The valid bitmap 25 may be a concept that covers or encompasses a valid page bitmap and/or a valid block bitmap.

In some example embodiments, each of the logical-to-physical address mapping table 23 and the valid bitmap 25 may be provided as a type of metadata.

Figure 3A:
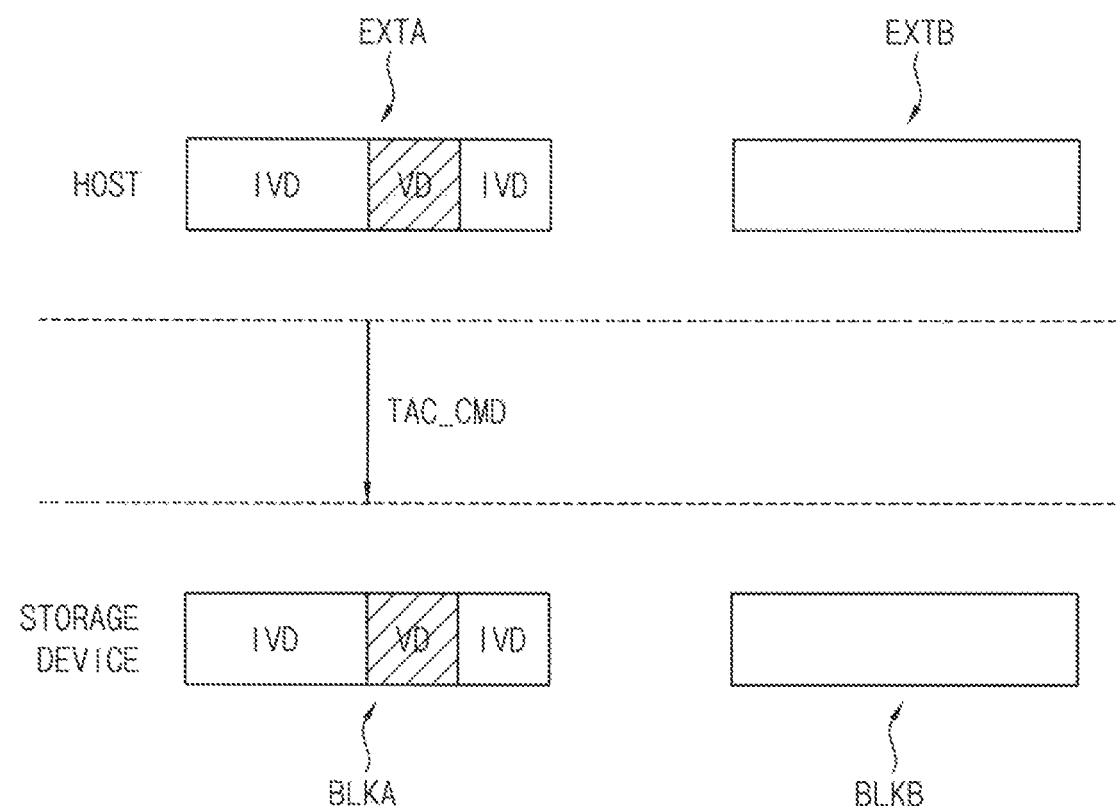

Referring to FIGS. 2 and 3A, a first data extent EXTA in the host 10 may include valid data VD and invalid data IVD. Similarly, a first memory block BLKA in the storage device 20, which corresponds to the first data extent EXTA in the host 10, may include valid data VD and invalid data IVD. The first data extent EXTA may be a logical section, and it may be enough or sufficient to be recognized by the host 10 that the data VD and IVD are stored based on locations and sequences illustrated in FIG. 3A. The data VD and IVD may not be actually stored in the host 10. The first memory block BLKA may be a physical section, and the data VD and IVD may be actually stored in the storage device 20.

In a conventional method, a host manages data by recognizing that storage spaces in a storage device are sequentially arranged from a first storage space to a last storage space, however, an actual arrangement of storage spaces in the storage device may be different from the arrangement of the storage spaces in the storage device recognized by the host. Thus, locations and sequences of data recognized by the host may also be different from locations and sequences of data actually stored in the storage device.

In the data management method according to example embodiments, when the storage device is configured to operate based on the multi-stream scheme, data with the same stream may be continuously arranged and may be stored in the same physical memory block. Thus, a configuration illustrated in FIG. 3A may be practicable, and it may be possible to employ the data management method according to example embodiments with respect to the host 10 and the storage device 20. In addition, the example embodiments may not be limited thereto, and may be employed based on one of various schemes in which an alignment or arrangement of a data extent (e.g., the first data extent EXTA) in the host 10 and an alignment or arrangement of a memory block (e.g., the first memory block BLKA) in the storage device 20 are matched with each other, as illustrated in FIG. 3A.

The host 10 may select or determine a first storage region as a target of the data compaction operation, and may provide a TRIM-after-COPY command TAC_CMD to the storage device 20 such that the data compaction operation is performed on the first storage region. In other words, the storage device 20 may receive the TRIM-after-COPY command TAC_CMD from the host 10. The first storage region may be a concept that includes, covers or encompasses the first data extent EXTA in the host 10 and the first memory block BLKA in the storage device 20. For example, the first storage region may be selected as the target of the data compaction operation based on one of various algorithms Referring to FIGS. 2 and 3B, the storage device 20 may internally copy the valid data VD in the first storage region into a second storage region based on the TRIM-after-COPY command TAC_CMD. As with the first storage region, the second storage region may be a concept that includes, covers or encompasses a second data extent EXTB in the host 10 and a second memory block BLKB in the storage device 20. The second storage region may be a free storage space or a free storage region. In other words, the second data extent EXTB may be a free data extent, and the second memory block BLKB may be a free memory block.

For example, the valid data VD in the first memory block BLKA may be read from the first memory block BLKA. The valid data VD read from the first memory block BLKA may not be transmitted to the second data extent EXTB, and may not be transmitted from the second data extent EXTB to the second memory block BLKB. Instead, the valid data VD read from the first memory block BLKA may be directly transmitted to the second memory block BLKB, and may be stored in the second memory block BLKB. For example, valid pages that correspond to the valid data VD may be read from the first memory block BLKA, and the valid pages read from the first memory block BLKA may be written into the second memory block BLKB. In other words, a data transmission between the host 10 and the storage device 20 may not be performed, and the valid data VD may be directly transmitted from the first memory block BLKA to the second memory block BLKB. Although FIG. 3B illustrates that the second data extent EXTB includes the valid data VD, it may be recognized by the host 10 that the valid data VD is copied into the second storage region, and the valid data VD may not be actually stored in the second data extent EXTB in the host 10. The second memory block BLKB may be a physical section, and the valid data VD may be actually stored in the storage device 20.

Referring to FIGS. 2 and 3C, the storage device 20 may perform the TRIM operation based on the TRIM-after-COPY command TAC_CMD to update the logical-to-physical address mapping table 23 and the valid bitmap 25 (e.g., a valid page bitmap). For example, logical addresses and physical addresses of the valid data VD may be changed from addresses of the first storage region (e.g., the first data extent EXTA and the first memory block BLKA) to addresses of the second storage region (e.g., the second data extent EXTB and the second memory block BLKB). For example, the logical-to-physical address mapping table 23 and the valid bitmap 25 may be updated in units of a block.

As described above, when the logical-to-physical address mapping table 23 and the valid bitmap 25 are updated, the first storage region may be collected or reclaimed from a used storage space to a free storage space. For example, the host 10 may recognize that the data VD and IVD are deleted from the first data extent EXTA. However, even if the TRIM operation is performed, the data VD and IVD stored in the first memory block BLKA may not be actually deleted from the first memory block BLKA. For example, although FIG. 3C illustrates that the first memory block BLKA does not include the data VD and IVD, it may represent that the first memory block BLKA receiving a deletion request is just marked as invalid. A data erase operation for the first memory block BLKA may be actually performed after the data compaction operation is completed and when other data are to be written into the first memory block BLKA.

When the data compaction operation is performed, a conventional storage device has a problem with higher command processing cost, data transmitting cost, TRIM requesting cost, etc. For example, in an example of FIG. 3A, the conventional storage device receives a data read command from the host 10, reads the valid data VD from the first memory block BLKA, actually transmits the valid data VD to the second data extent EXTB in the host 10, receives a data write command and the valid data VD from the host 10, stores the valid data VD in the second memory block BLKB, receives a TRIM command from the host 10, and updates the logical-to-physical address mapping table 23 and the valid bitmap 25. Thus, the conventional storage device needs relatively high cost and time required to perform the data compaction operation.

In the data management method according to example embodiments, an efficiency of the data compaction operation may be improved or enhanced based on the TRIM-after-COPY command TAC_CMD that represents a single command in which the data read/write commands and the TRIM command are combined or integrated with each other. For example, in the storage device in which stored data are managed based on the log-structured scheme, the valid data VD may be internally copied based on the TRIM-after-COPY command TAC_CMD, and at the same time, the logical-to-physical address mapping table 23 and the valid bitmap 25 may be updated. Accordingly, overhead caused by the data compaction operation may be reduced, software executed by the host 10 may have relatively improved or enhanced performance and reduced processing cost during the data compaction operation, and an interface between the host 10 and the storage device 20 may have relatively reduced bandwidth and processing cost during the data compaction operation.

FIG. 4 is a diagram illustrating an example of a TRIM-after-COPY command that is used in a data management method according to example embodiments.

Referring to FIG. 4, a TRIM-after-COPY command TAC_CMD may include an operation code OP_CD, first address information TRIM_RNG and second address information COPY_RNG.

The operation code OP_CD may be any code for representing the TRIM-after-COPY command TAC_CMD.

The first address information TRIM_RNG may represent information that is associated with the TRIM operation described with reference to FIGS. 1, 3A and 3C. For example, the first address information TRIM_RNG may include information of a TRIM sequential logical block address (LBA) range that represents a target of the TRIM operation. In other words, a storage region receiving a TRIM request may correspond to a range of logical block addresses that are sequentially allocated.

The information of the TRIM sequential logical block address range may include a start logical block address ST_LBA of the TRIM sequential logical block address range and a length LBA_L of the TRIM sequential logical block address range. For example, when the first address information TRIM_RNG is provided as [1000, 256], it may represent that the start logical block address ST_LBA of the TRIM sequential logical block address range is "1000," and the length LBA_L of the TRIM sequential logical block address range is "256."

The second address information COPY_RNG may represent information that is associated with the data copy operation for the valid data described with reference to FIGS. 1, 3B and 3C. For example, the second address information COPY_RNG may include a source logical block address SRC_LBA and a destination logical block address DST_LBA. For example, the source logical block address SRC_LBA may be a logical block address of the first storage region in which the valid data are stored, and the destination logical block address DST_LBA may be a logical block address of the second storage region to which the valid data are to be copied.

Figure 5:
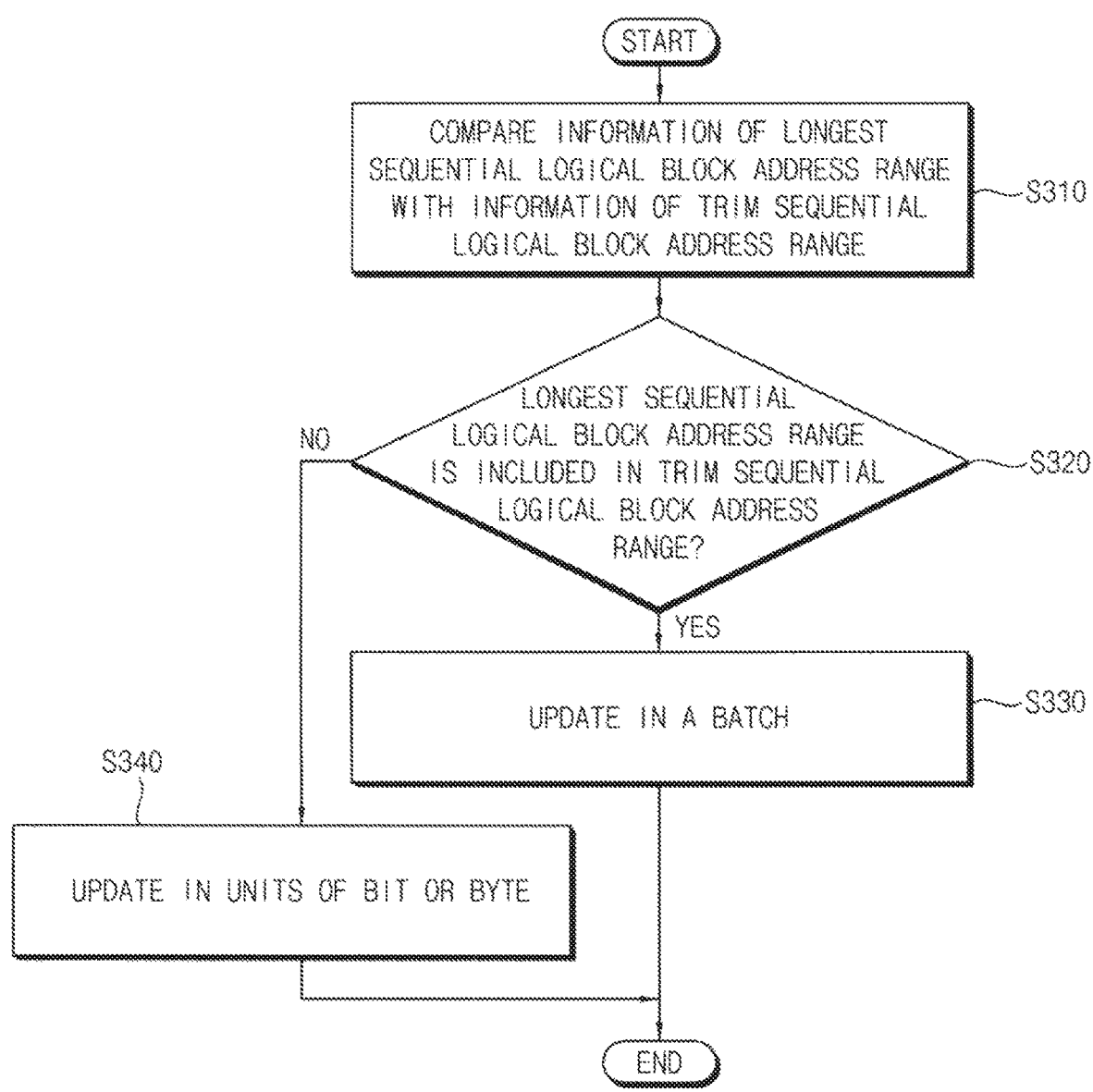
FIG. 5 is flow chart illustrating an example of performing a TRIM operation in FIG. 1.
Figure 6:
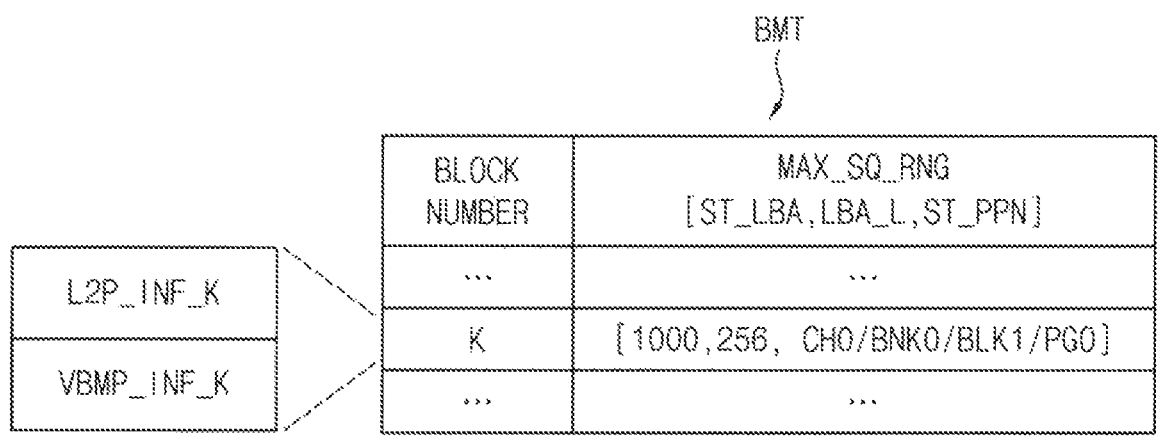
FIG. 6 is a diagram illustrating an example of a longest sequential logical block address range table that is used in the TRIM operation of FIG. 5.

FIG. 5 is flow chart illustrating an example of performing a TRIM operation in FIG. 1. FIG. 6 is a diagram illustrating an example of a longest sequential logical block address range table that is used in the TRIM operation of FIG. 5.

Referring to FIGS. 1, 4, 5 and 6, in performing the TRIM operation to update the logical-to-physical address mapping table and the valid page bitmap (e.g., in step S300), information of a longest sequential logical block address range may be compared with the information of the TRIM sequential logical block address range (step S310). The longest sequential logical block address range may be pre-registered, and the TRIM sequential logical block address range may represent the target of the TRIM operation (e.g., the storage region receiving the TRIM request).

In some example embodiments, the information of the longest sequential logical block address range may be registered during a data write operation. For example, as illustrated in FIG. 6, the information of the longest sequential logical block address range MAX_SQ_RNG may be managed for each memory block in a longest sequential logical block address range table BMT for different memory blocks. The information of the longest sequential logical block address range MAX_SQ_RNG for a memory block may be registered in the longest sequential logical block address range table BMT at a time point at which the data write operation for the memory block is initially requested.

In some example embodiments, the information of the longest sequential logical block address range MAX_SQ_RNG may include a length LBA_L of the longest sequential logical block address range, a start logical block address ST_LBA of the longest sequential logical block address range, and a start physical address ST_PPN of the longest sequential logical block address range. The start physical address ST_PPN may correspond to the start logical block address ST_LBA. For example, the start physical address ST_PPN may include a physical page number and/or a physical block number. For example, when the information of the longest sequential logical block address range MAX_SQ_RNG for a K-th memory block is registered as [1000, 256, CH0/BNK0/BLK1/PG0], where K is a natural number, it may represent that the start logical block address ST_LBA of the longest sequential logical block address range for the K-th memory block is "1000," the length LBA_L of the longest sequential logical block address range for the K-th memory block is "256," and a channel, bank, memory block and page of the start physical address ST_PPN of the longest sequential logical block address range for the K-th memory block are "CH0," "BNK0," "BLK1" and "PG0," respectively.

When the longest sequential logical block address range is included in the TRIM sequential logical block address range, e.g., when the TRIM sequential logical block address range includes the longest sequential logical block address range (step S320: YES), the logical-to-physical address mapping table and the valid page bitmap may be updated at once or in a batch (step S330). For example, the logical-to-physical address mapping table and the valid page bitmap may be updated in a batch based on a memory set (MEM-SET) library operation or a direct memory access (DMA) operation using hardware. The memory set library operation and/or the DMA operation may be performed by the host 10.

As described above, to update the logical-to-physical address mapping table and the valid page bitmap in a batch, the longest sequential logical block address range table BMT may include batch update information for each memory block. For example, the longest sequential logical block address range table BMT may include information of logical-to-physical address mapping table L2P_INF_K for the K-th memory block and information of valid bitmap VBMP_INF_K for the K-th memory block. For example, the information of the logical-to-physical address mapping table L2P_INF_K and the information of the valid bitmap VBMP_INF_K may be provided as a type of metadata and may be adjacent to each other such that the logical-to-physical address mapping table and the valid page bitmap are updated in a batch.

When the longest sequential logical block address range is not included in the TRIM sequential logical block address range (step S320: NO), the logical-to-physical address mapping table and the valid page bitmap may be updated in units of bit or byte (step S340).

In some example embodiments, the longest sequential logical block address range table BMT may be provided as a type of metadata.

When the TRIM operation is performed, a conventional storage device sequentially updates a logical-to-physical address mapping table and a valid page bitmap in units of logical page mapped by the conventional storage device (e.g., about 4KB, 8KB, etc.), even if a target of the TRIM operation or a storage region receiving a TRIM request corresponds to a sequential logical block address range (e.g., a range of logical block addresses that are sequentially allocated). Thus, the conventional storage device has relatively high processing cost, and it is difficult to update the logical-to-physical address mapping table and the valid page bitmap in real-time or during runtime.

In the data management method according to example embodiments, the logical-to-physical address mapping table and the valid page bitmap may be updated at once or in a batch (e.g., in units of a block) when the longest sequential logical block address range is included in the TRIM sequential logical block address range. Accordingly, the TRIM operation may be efficiently performed in the storage device 20, and the storage device 20 may have relatively reduced processing cost during the TRIM operation.

Figure 7:
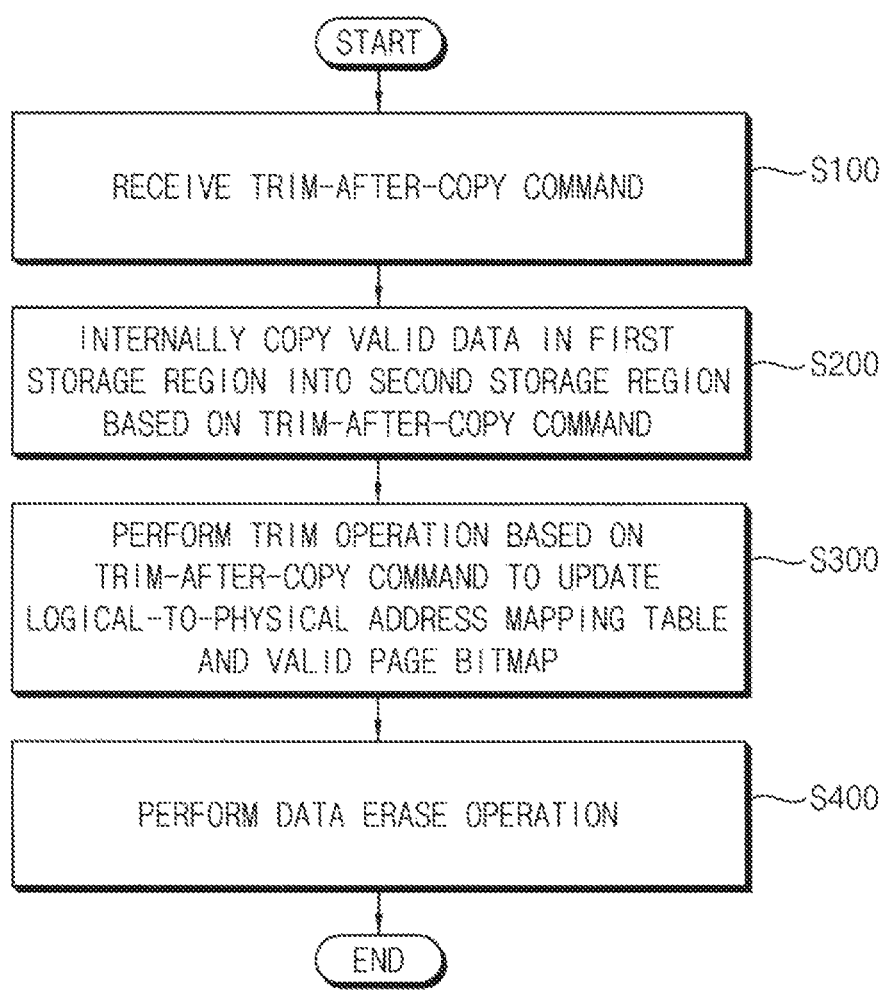
FIGS. 7 and 8 are flow charts illustrating a data management method according to example embodiments.
Figure 8:
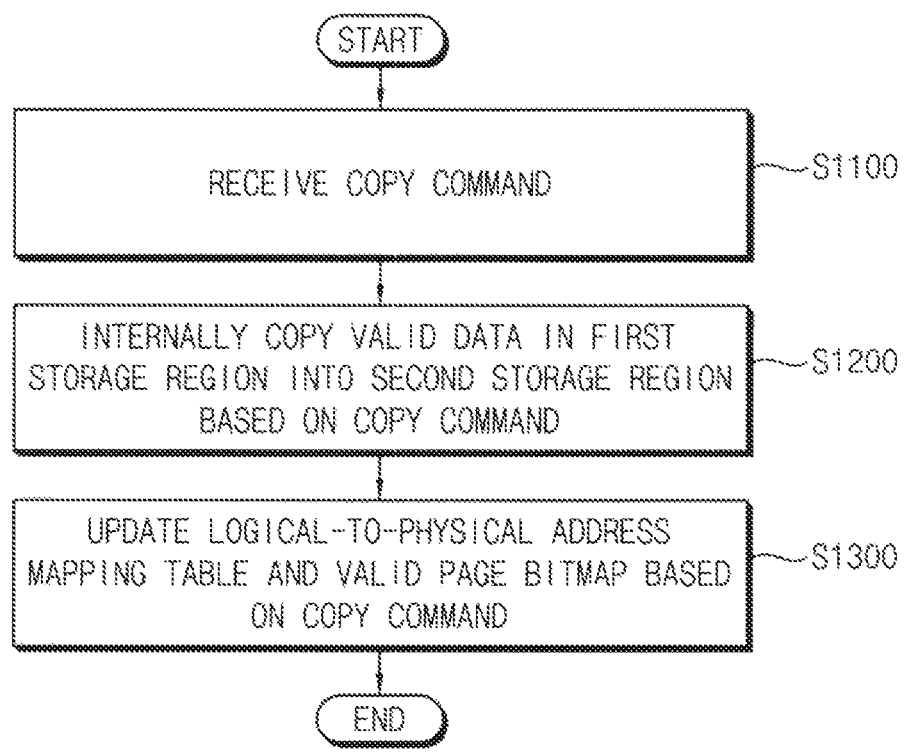

FIGS. 7 and 8 are flow charts illustrating a data management method according to example embodiments.

Referring to FIG. 7, a data management method according to example embodiments is executed by a storage device that includes a nonvolatile memory device including a plurality of memory blocks.

Steps S100, S200 and S300 in FIG. 7 may be substantially the same as steps S100, S200 and S300 in FIG. 1, respectively, and thus repeated explanation will be omitted.

After the TRIM operation is performed, a data erase operation may be performed on the first storage region (step S400). For example, the data erase operation may be performed on a first memory block (e.g., the first memory block BLKA in FIG. 3C) corresponding to the first storage region.

Unlike an example of FIG. 1, the TRIM operation and the data erase operation may be substantially simultaneously or concurrently performed in an example of FIG. 7.

Referring to FIG. 8, a data management method according to example embodiments is executed by a storage device that includes a nonvolatile memory device including a plurality of memory blocks.

A copy command is received from an external host such that a data copy operation is performed on a first storage region (step S1100). The data copy operation represents an operation for reading valid data from the first storage region and writing the valid data into another storage region. The copy command may represent a single command in which a data read command and a data write command are combined or integrated with each other.

The valid data stored in the first storage region are internally copied into a second storage region based on the copy command (step S1200). An operation of internally copying the valid data may represent an operation in which the valid data are directly copied from the first storage region into the second storage region in the storage device without going through the external host. For example, the first storage region and the second storage region may be logically and physically different from each other. The data copy operation for the valid data may be substantially the same as the data copy operation described with reference to FIGS. 3A and 3B.

In some example embodiments, the copy command may include an operation code and address information. The operation code may be any code for representing the copy command The address information may include a source logical block address of the first storage region in which the valid data are stored, and a destination logical block address of the second storage region to which the valid data are to be copied. In other words, the copy command may be similar to the TRIM-after-COPY command TAC_CMD illustrated in FIG. 4, and may only include the operation code OP_CD and the second address information COPY_RNG in FIG. 4 without the first address information TRIMRNG in FIG. 4.

A logical-to-physical address mapping table and a valid page bitmap are updated based on the copy command (step S1300). An operation of updating the logical-to-physical address mapping table and the valid page bitmap represent an operation in which logical addresses and physical addresses of the copied valid data are updated. In other words, the logical addresses and the physical addresses of the valid data may be changed at once or in a batch as the data copy operation for the valid data is performed.

In the data management method according to example embodiments, the data copy operation may be efficiently performed based on the copy command that represents a single command in which the data read and write commands are combined or integrated with each other. Accordingly, software executed by the host may have relatively improved or enhanced performance and reduced processing cost during the data copy operation, an interface between the host and the storage device may have relatively reduced bandwidth and processing cost during the data copy operation, and the storage device may be efficiently managed or controlled with optimized or best performance Although the example embodiments are described based on the data compaction operation and the data copy operation, the example embodiments may not be limited thereto. For example, the example embodiments may be applied to various operations in which the internal data copy operation and any operation immediately after or subsequent to the internal data copy operation are performed based on a single command (e.g., a XXX-after-COPY command)

As will be appreciated by those skilled in the art, the present disclosure may be embodied as a system, method, computer program product, and/or a computer program product embodied in one or more computer readable medium(s) having computer readable program code embodied thereon. The computer readable program code may be provided to a processor of a general-purpose computer, special purpose computer, or other programmable data processing apparatus. The computer readable medium may be a computer readable signal medium or a computer readable storage medium. The computer readable storage medium may be any tangible medium that can contain, or store a program for use by or in connection with an instruction execution system, apparatus, or device. For example, the computer readable medium may be a non-transitory computer readable medium.

Figure 9:
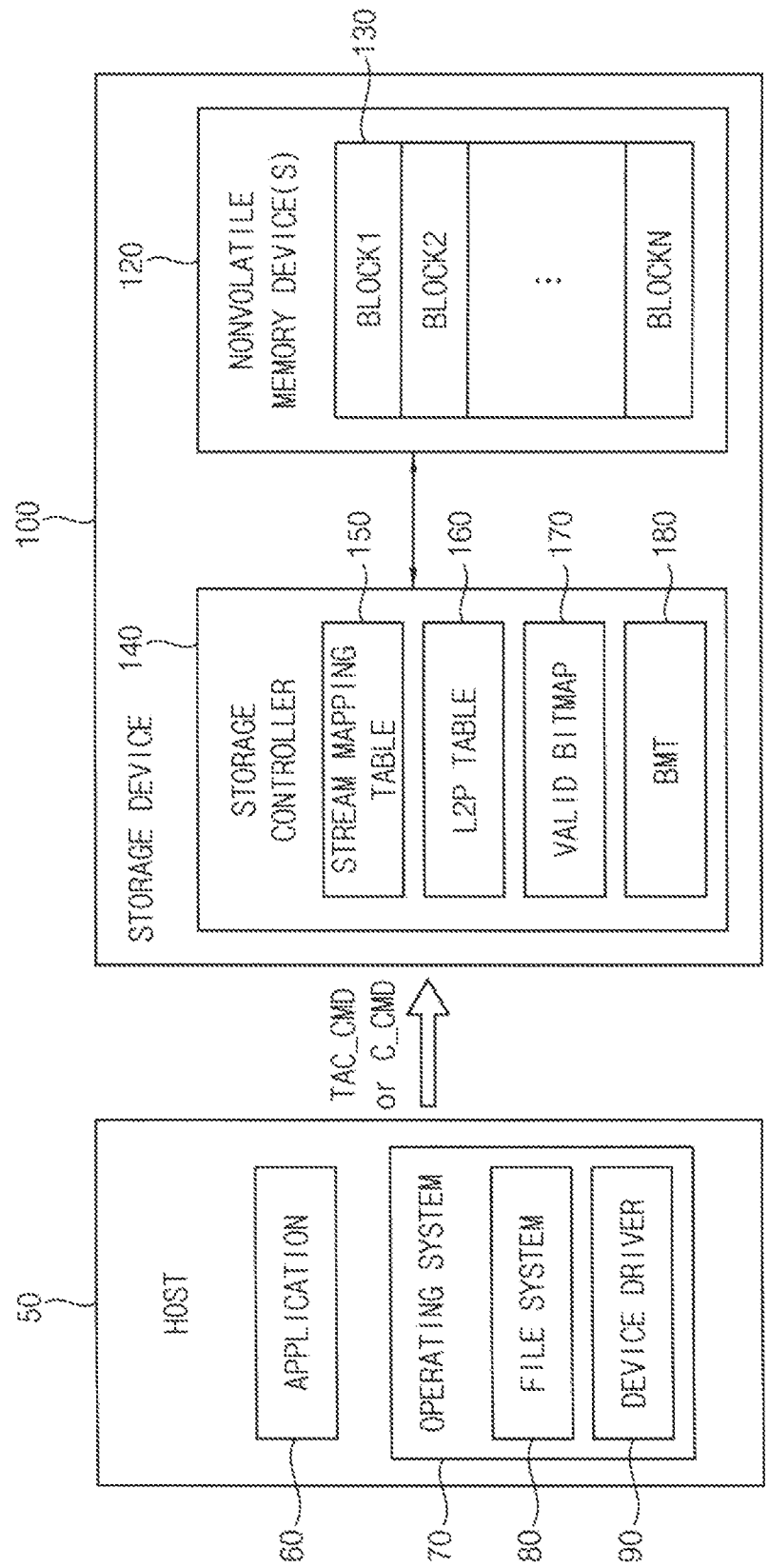
FIG. 9 is a block diagram illustrating a computing system that includes a storage device according to example embodiments.

FIG. 9 is a block diagram illustrating a computing system that includes a storage device according to example embodiments.

Referring to FIG. 9, a computing system may include a host 50 and a storage device 100 that is attached or inserted to the host 50.

The host 50 may be driven by executing an operating system (OS) 70. The operating system 70 may include a file system 80 for file management and a device driver 90 for controlling peripheral devices including the storage device 100 at the operating system level. The file system 80 may manage file names, extensions, file attributes, file sizes, cluster information, etc. of files accessed by requests from the host 50 or applications executed by the host 50. The file system 80 may generate, delete and manage data on a file basis. For example, the file system 80 may manage or control the data based on the log-structured scheme. The device driver 90 may be a software module of a kernel for controlling the storage device 100. The host 50 or the applications executed by the host 50 may request a data write operation and a data read operation to the storage device 100 via the device driver 90. The host 50 may execute a plurality of applications 60 provide various services. For example, the host 50 may execute a video application, a game application, a web browser application, etc.

In some example embodiments, the host 50 may be one of various electronic systems such as a personal computer, a laptop computer, a mobile phone, a smart phone, a tablet computer, a personal digital assistants (PDA), an enterprise digital assistant (EDA), a portable multimedia player (PMP), a digital camera, a music player, a portable game console, a navigation device, a wearable device, an internet of things (IoT) device, an internet of everything (IoE) device, an e-book, a virtual reality (VR) device, an augmented reality (AR) device, etc.

The storage device 100 includes at least one nonvolatile memory device 120 that includes a plurality of memory blocks (BLOCK1, BLOCK2, . . . , BLOCKN) 130 each having a plurality of nonvolatile memory cells, and a storage controller 140 that controls the nonvolatile memory device 120.

The storage controller 140 controls an operation of the nonvolatile memory device 120, e.g., a data write, read or erase operation, based on a command and data that are received from the host 50. In addition, the storage controller 140 controls the nonvolatile memory device 120. In some example embodiments, the nonvolatile memory device 120 may operate based on the multi-stream scheme. Based on the multi-stream scheme and the control of the storage controller 140, write data, which are written into the plurality of memory blocks 130, may be classified into and managed by a plurality of streams, and data with a single stream may be written into a single memory block. For example, the host 50 may provide the write data and a plurality of stream identifiers (IDs), each of which represents a respective one of the plurality of streams. Alternatively, the storage controller 140 may set the plurality of stream IDs for the write data by itself. The storage controller 140 may include a stream mapping table 150 that registers a relationship between the plurality of memory blocks 130 and the plurality of stream IDs. In other example embodiments, when the storage device 100 does not operate based on the multi-stream scheme and operates based on one of various schemes in which an alignment or arrangement of data extents in the host 50 and an alignment or arrangement of memory blocks in the storage device 100 are matched with each other, the stream mapping table 150 may be omitted.

The storage controller 140 controls the nonvolatile memory device 120 such that the data compaction operation and/or the data copy operation are performed according to example embodiments.

The data compaction operation may be performed based on the data management method described with reference to FIGS. 1 through 7. For example, the storage controller 140 receives a TRIM-after-COPY command TAC_CMD from the host 50, internally copies valid data in a first storage region into a second storage region based on the TRIM-after-COPY command TAC_CMD, and performs a TRIM operation based on the TRIM-after-COPY command TAC_CMD to update a logical-to-physical address mapping table 160 and a valid page bitmap 170. In addition, when a target of the TRIM operation or a storage region receiving a TRIM request corresponds to a sequential logical block address range (e.g., a range of logical block addresses that are sequentially allocated), the logical-to-physical address mapping table 160 and the valid page bitmap 170 may be updated at once or in a batch (e.g., in units of a block) based on information of a TRIM sequential logical block address range, and a longest sequential logical block address range table 180 may be used for updating the logical-to-physical address mapping table 160 and the valid page bitmap 170

The data copy operation may be performed based on the data management method described with reference to FIG. 8. For example, the storage controller 140 receives a copy command C_CMD from the host 50, internally copies valid data in a first storage region into a second storage region based on the copy command C_CMD, and updates the logical-to-physical address mapping table 160 and the valid page bitmap 170.

Accordingly, software executed by the host 50 may have relatively improved or enhanced performance and reduced processing cost, an interface between the host 50 and the storage device 100 may have relatively reduced bandwidth and processing cost, and the storage device 100 may be efficiently managed or controlled with optimized or best performance In some example embodiments, the storage device 100 may be one of a solid-state drive (SSD), a multi media card (MMC), an embedded multi media card (eMMC) and a universal flash storage (UFS). In other example embodiments, the storage device 100 may be a secure digital (SD) card, a micro SD card, a memory stick, a chip card, a universal serial bus (USB) card, a smart card, a compact flash (CF) card, or the like.

Figure 10:
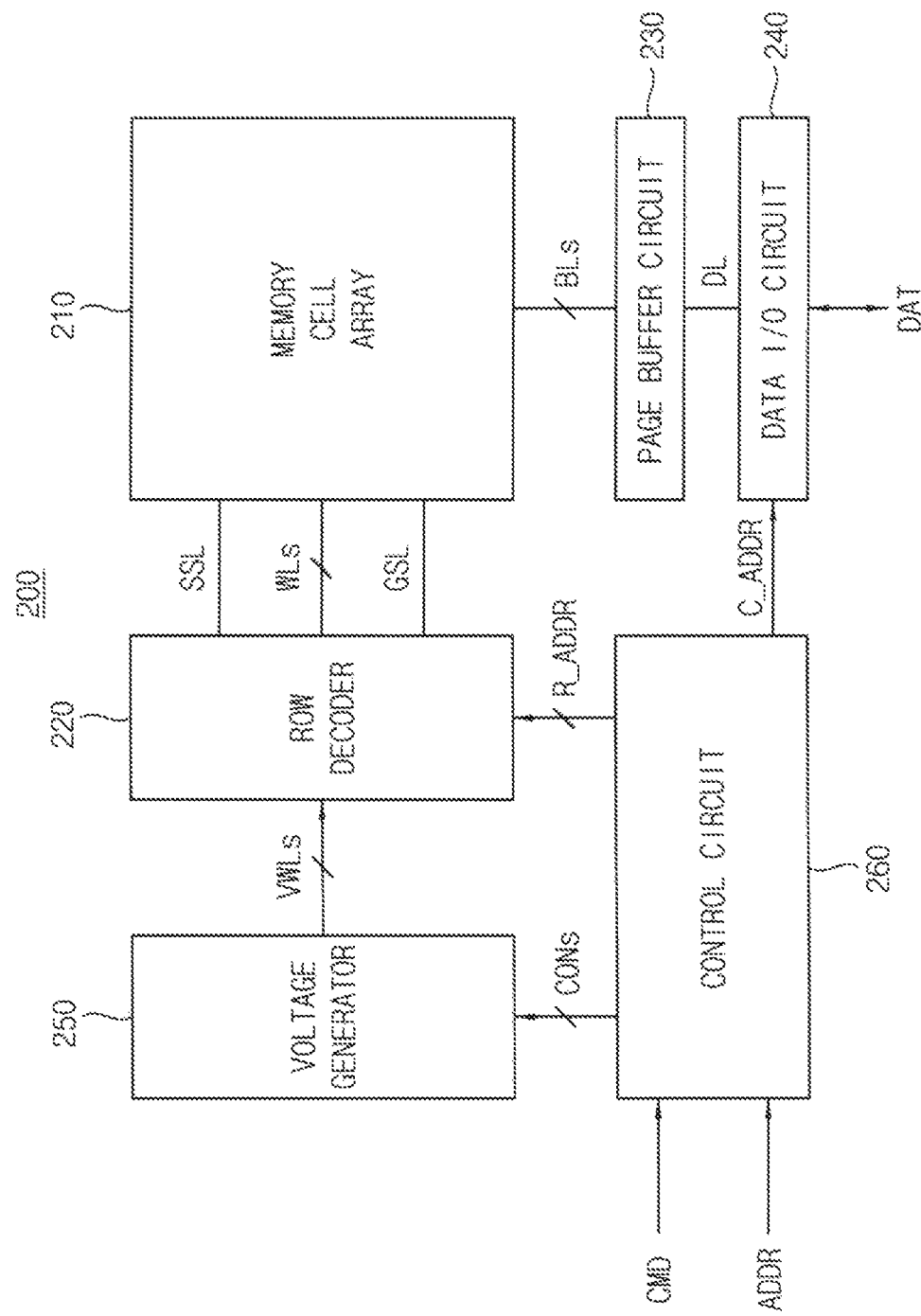
FIG. 10 is a block diagram illustrating an example of a nonvolatile memory device that is included in a storage device of FIG. 9.

FIG. 10 is a block diagram illustrating an example of a nonvolatile memory device that is included in a storage device of FIG. 9.

Referring to FIG. 10, a nonvolatile memory device 200 may include a memory cell array 210, a row decoder 220, a page buffer circuit 230, a data input/output (I/O) circuit 240, a voltage generator 250 and a control circuit 260.

The memory cell array 210 may be connected to the row decoder 220 via a string selection line SSL, a plurality of wordlines WLs and a ground selection line GSL. The memory cell array 210 may be further connected to the page buffer circuit 230 via a plurality of bitlines BLs.

The memory cell array 210 may include a plurality of nonvolatile memory cells that are connected to the plurality of wordlines WLs and the plurality of bitlines BLs. As will be described with reference to FIGS. 11A and 11B, the plurality of nonvolatile memory cells may be arranged in a two-dimensional (2D) array structure or a three-dimensional (3D) vertical array structure.

The control circuit 260 may receive a command CMD and an address ADDR from a storage controller (e.g., the storage controller 140 in FIG. 9), and may control the row decoder 220, the page buffer circuit 230, the data I/O circuit 240 and the voltage generator 250 based on the command CMD and the address ADDR to perform data write (or program)/read/erase operations for the memory cell array 210.

For example, the control circuit 260 may generate control signals CONs for controlling the voltage generator 250 based on the command CMD, and may generate a row address R_ADDR and a column address C_ADDR based on the address ADDR. The control circuit 260 may provide the row address R_ADDR to the row decoder 220, and may provide the column address C_ADDR to the data I/O circuit 240.

The row decoder 220 may be connected to the memory cell array 210 via the string selection line SSL, the plurality of wordlines WLs and the ground selection line GSL. The row decoder 220 may determine at least one of the plurality of wordlines WLs as a selected wordline, and may determine the rest of the plurality of wordlines WLs as unselected wordlines, based on the row address R_ADDR.

The voltage generator 250 may generate wordline voltages VWLs that are required for an operation of the nonvolatile memory device 200 based on a power supply voltage and the control signals CONs. The wordline voltages VWLs may be applied to the plurality of wordlines WLs via the row decoder 220.

For example, during the data erase operation, the voltage generator 250 may apply an erase voltage to a well or a common source line of a memory block, and may apply a ground voltage to entire wordlines of the memory block. During an erase verification operation, the voltage generator 250 may apply an erase verification voltage to all of the wordlines of the memory block or sequentially apply the erase verification voltage on a wordline-by-wordline basis. During the data program operation (or the data write operation), the voltage generator 250 may apply a program voltage to the selected wordline, and may apply a program pass voltage to the unselected wordlines. During a program verification operation, the voltage generator 250 may apply a program verification voltage to the selected wordline, and may apply a verification pass voltage to the unselected wordlines. During the data read operation, the voltage generator 250 may apply a read voltage to the selected wordline, and may apply a read pass voltage to the unselected wordlines.

The page buffer circuit 230 may be connected to the memory cell array 210 via the plurality of bitlines BLs. The page buffer circuit 230 may include a plurality of page buffers. In some example embodiments, each page buffer may be connected to one bitline. In other example embodiments, each page buffer may be connected to two or more bitlines.

The page buffer circuit 230 may store write data DAT to be programmed into the memory cell array 210 or may read data DAT sensed from the memory cell array 210. In other words, the page buffer circuit 230 may operate as a write driver or a sensing amplifier according to an operation mode of the nonvolatile memory device 200.

The data I/O circuit 240 may be connected to the page buffer circuit 230 via a data line DL. The data I/O circuit 240 may provide the data DAT from an outside of the nonvolatile memory device 200 (e.g., from the storage controller 140 in FIG. 9) to the memory cell array 210 via the page buffer circuit 230 or may provide the data DAT from the memory cell array 210 to the outside of the nonvolatile memory device 100, based on the column address C_ADDR.

Figure 11A:
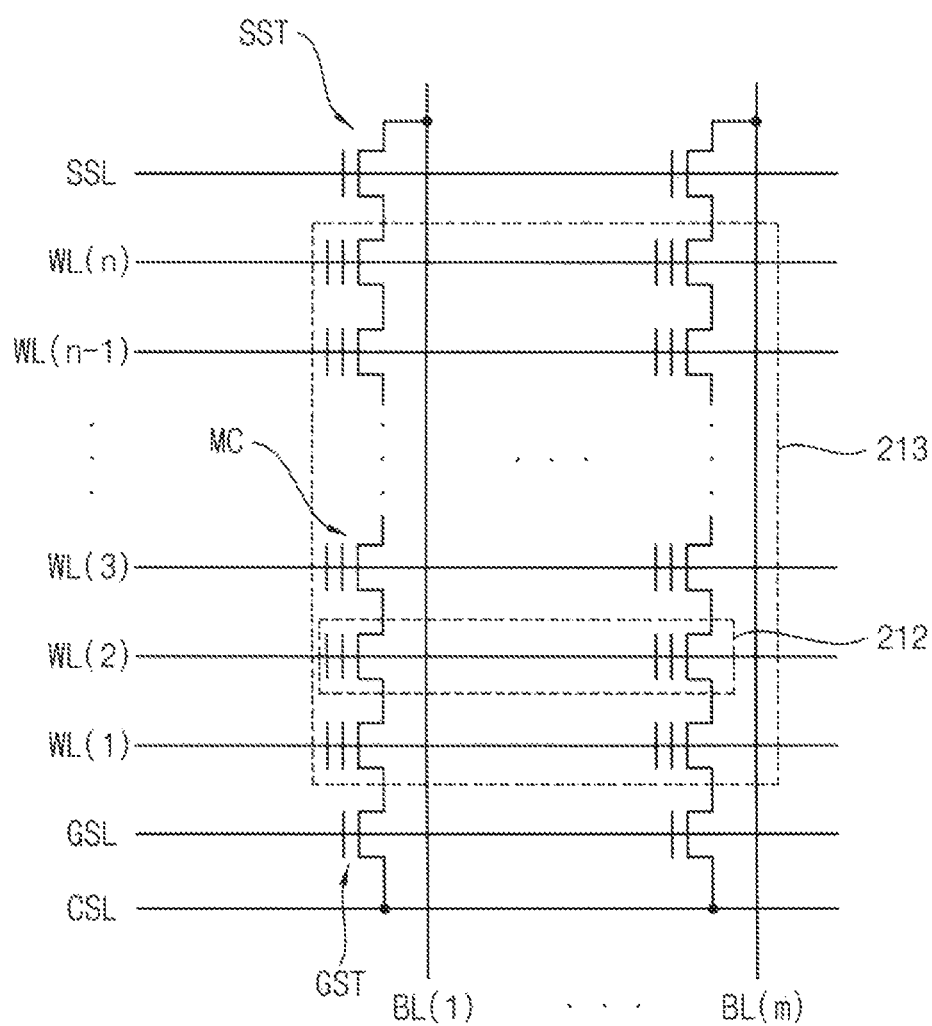
FIGS. 11A and 11B are diagrams illustrating examples of a memory cell array that is included in the nonvolatile memory device of FIG. 10.
Figure 11B:
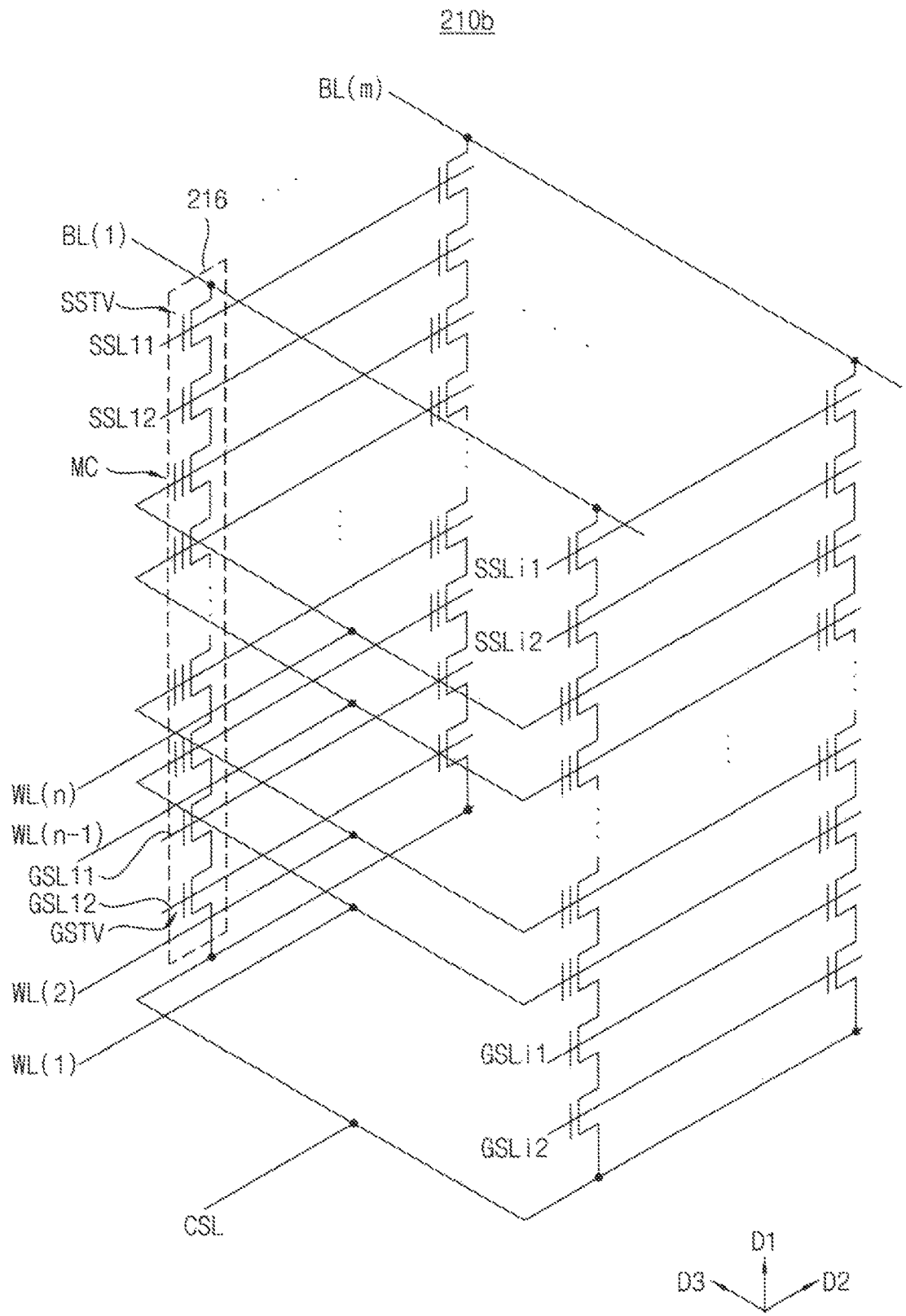

FIGS. 11A and 11B are diagrams illustrating examples of a memory cell array that is included in the nonvolatile memory device of FIG. 10. FIG. 11A is a circuit diagram illustrating an example of a memory cell array included in a NAND flash memory device. FIG. 11B is a circuit diagram illustrating an example of a memory cell array included in a vertical NAND flash memory device.

Referring to FIG. 11A, a memory cell array 210a may include string selection transistors SST, ground selection transistors GST, and memory cells MC. The string selection transistors SST may be connected to bitlines BL(1), ... , BL(m), and the ground selection transistors GST may be connected to a common source line CSL. The memory cells arranged in the same row may be disposed in series between one of the bitlines BL(1)~BL(m) and the common source line CSL, and the memory cells arranged in the same column may be connected in common to one of wordlines WL(1), WL(2), WL(3), ... , WL(n-1), WL(n). In other words, the memory cells MC may be connected in series between the string selection transistors SST and the ground selection transistors GST, and 16, 32, or 64 wordlines may be disposed between a string selection line SSL connected to the string selection transistors SST and a ground selection line GSL connected to the ground selection transistors GST.

The string selection transistors SST may be connected to the string selection line SSL such that the string selection transistors SST are controlled according to a level of a voltage applied from the string selection line SSL. The ground selection transistors GST may be connected to the ground selection line GSL such that the ground selection transistors GST are controlled according to a level of a voltage applied from the ground selection line GSL. The memory cells MC may be controlled according to levels of voltages applied to the wordlines WL(1)~WL(n).

The NAND flash memory device including the memory cell array 210a may perform the data read and write operations in units of page 212 and the data erase operation in units of block 213.

Referring to FIG. 11B, a memory cell array 210b may include a plurality of strings 216 having a vertical structure. The plurality of strings 216 may be formed in a second direction D2 such that a string row may be formed. A plurality of string rows may be formed in a third direction D3 such that a string array may be formed. Each of the strings 216 may include ground selection transistors GSTV, memory cells MC, and string selection transistors SSTV which are disposed in series in a first direction D1 between bitlines BL(1), ..., BL(m) and a common source line CSL.

The ground selection transistors GSTV may be connected to ground selection lines GSL11, GSL12, ... GSLi1, GSLi2, and the string selection transistors SSTV may be connected to string selection lines SSL11, SSL12, ... SSLi1, SSLi2. The memory cells MC arranged on the same layer may be connected in common to one of wordlines WL(1), WL(2), ..., WL(n-1), WL(n). The ground selection lines GSL11~GSLi2 and the string selection lines SSL11~SSLi2 may extend in the second direction D2 and may be formed along the third direction D3. The wordlines WL(1)~WL(n) may extend in the second direction D2 and may be formed along the first and third directions D1 and D3. The bitlines BL(1)~BL(m) may extend in the third direction D3 and may be formed along the second direction D2. The memory cells MC may be controlled according to levels of voltages applied to the wordlines WL(1)~WL(n).

A three-dimensional (3D) vertical array structure may include vertical NAND strings that are vertically oriented such that at least one memory cell is located over another memory cell. The at least one memory cell may include a charge trap layer. The following patent documents, which are hereby incorporated by reference in their entireties, describe suitable configurations for a memory cell array including a 3D vertical array structure, in which the 3D memory array is configured as a plurality of levels, with wordlines and/or bitlines shared between levels: U.S. Pat. Nos. 7,679,133, 8,553,466, 8,654,587, and 8,559,235, and US Pat. Pub. No. 2011/0233648.

Although the memory cell array included in the nonvolatile memory device according to example embodiments is described based on a flash memory device, the nonvolatile memory device according to example embodiments may be any nonvolatile memory device, e.g., a phase random access memory (PRAM), a resistive random access memory (RRAM), a nano floating gate memory (NFGM), a polymer random access memory (PoRAM), a magnetic random access memory (MRAM), a ferroelectric random access memory (FRAM), a thyristor random access memory (TRAM), etc.

Figure 12:
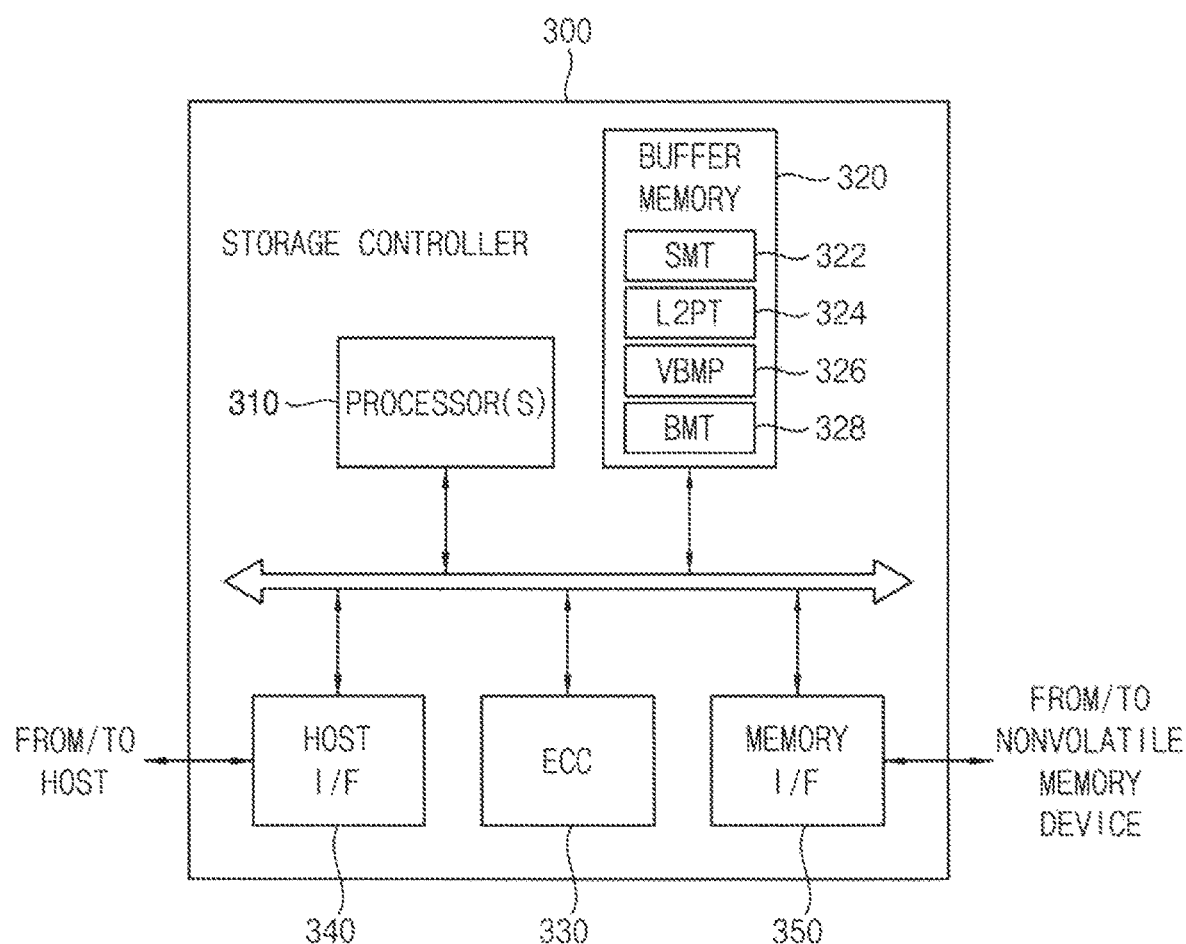
FIG. 12 is a block diagram illustrating an example of a storage controller that is included in the storage device of FIG. 9.

FIG. 12 is a block diagram illustrating an example of a storage controller that is included in the storage device of FIG. 9.

Referring to FIG. 12, a storage controller 300 may include at least one processor 310, a buffer memory 320, an error correction code (ECC) block 330, a host interface 340 and a memory interface 350.

The processor 310 may control an operation of the storage controller 300 in response to a command received via the host interface 340 from a host (e.g., the host 50 in FIG. 9). In some example embodiments, the processor 310 may control respective components by employing firmware for operating a storage device (e.g., the storage device 100 in FIG. 9).

The buffer memory 320 may store instructions and data executed and processed by the processor 310. For example, the buffer memory 320 may be implemented with a volatile memory device, such as a static random-access memory (SRAM), a dynamic random-access memory (DRAM), or the like. The buffer memory 320 may include a stream mapping table 322, a logical-to-physical address mapping table 324, a valid page bitmap 326 and a longest sequential logical block address range table 328. In some example embodiments, the buffer memory 320 may be a cache memory for the processor 310. In some example embodiments, the buffer memory 320 may be disposed or located outside the storage controller 300.

The ECC block 330 for error correction may perform coded modulation using a Bose-Chaudhuri-Hocquenghem (BCH) code, a low-density parity check (LDPC) code, a turbo code, a Reed-Solomon code, a convolution code, a recursive systematic code (RSC), a trellis-coded modulation (TCM), a block coded modulation (BCM), etc., or may perform ECC encoding and ECC decoding using above-described codes or other error correction codes.

The host interface 340 may provide physical connections between the host 50 and the storage device 100. The host interface 340 may provide an interface corresponding to a bus format of the host 50 for communication between the host 50 and the storage device 100. In some example embodiments, the bus format of the host 50 may be a small computer system interface (SCSI) or a serial attached SCSI (SAS) interface. In other example embodiments, the bus format of the host 50 may be a USB, a peripheral component interconnect (PCI) express (PCIe), an advanced technology attachment (ATA), a parallel ATA (PATA), a serial ATA (SATA), a nonvolatile memory (NVM) express (NVMe), etc., format.

The memory interface 350 may exchange data with a nonvolatile memory device (e.g., the nonvolatile memory device 120 in FIG. 9). The memory interface 350 may transfer data to the nonvolatile memory device 120, or may receive data read from the nonvolatile memory device 120. In some example embodiments, the memory interface 350 may be connected to the at least one nonvolatile memory device 120 via one channel In other example embodiments, the memory interface 350 may be connected to the at least one nonvolatile memory device 120 via two or more channels.

Figure 13:
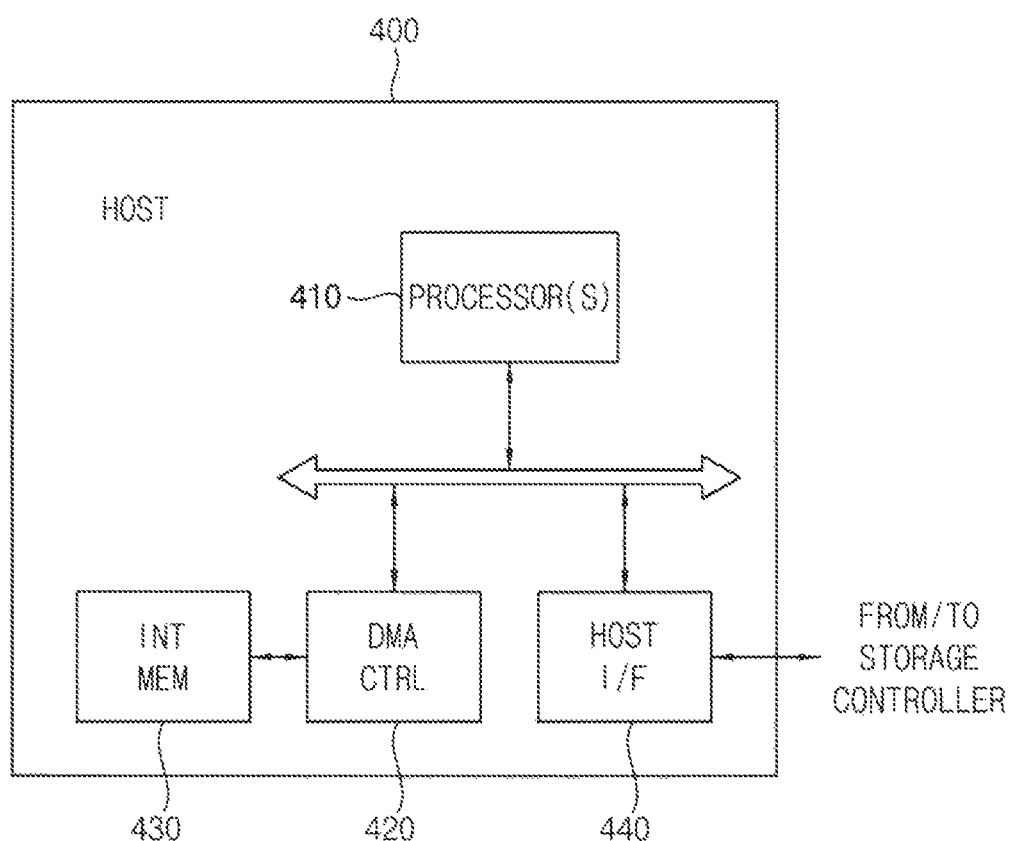
FIG. 13 is a block diagram illustrating an example of a host that is included in the computing system of FIG. 9.

FIG. 13 is a block diagram illustrating an example of a host that is included in the computing system of FIG. 9.

Referring to FIG. 13, a host 400 may include at least one processor 410, a direct memory access (DMA) controller 420, an internal memory 430 and a host interface 440.

The processor 410 may control an operation of the host 400. For example, at least one application (e.g., the plurality of applications 60 in FIG. 9) and an operating system (e.g., the operating system 70 in FIG. 9) may be executed by the processor 410.

The DMA controller 420 may control the internal memory 430 and may perform a DMA operation. For example, when step S330 in FIG. 5 is performed, the DMA controller 420 may perform the DMA operation to update the logical-to-physical address mapping table and the valid page bitmap in a batch or at once.

The internal memory 430 may store instructions and/or data that are executed and/or processed by the processor 410. For example, the internal memory 430 may include at least one volatile memory and may be a cache memory for the processor 410.

The host interface 440 may provide physical connections between the host 400 and a storage device (e.g., the storage device 100 in FIG. 9). For example, the host interface 440 may provide an interface corresponding to a bus format of the host 400 for communication between the host 400 and the storage device 100. The bus format of the host interface 440 may be substantially the same as the bus format of the host interface 340 in FIG. 12.

The present disclosure may be applied to storage devices including nonvolatile memory devices. For example, the present disclosure may be applied to an SSD, an MMC, an eMMC or a UFS including flash memory devices.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A data management method executed by a storage device that includes a nonvolatile memory device including a plurality of memory blocks, the method comprising:
    receiving a TRIM-after-COPY command from an external host such that a data compaction operation is performed on a first storage region;
    internally copying valid data stored in the first storage region into a second storage region based on the TRIM-after-COPY command; and
    performing a TRIM operation based on the TRIM-after-COPY command to update a logical-to-physical address mapping table and a valid page bitmap.

2. The method of claim 1, wherein the TRIM-after-COPY command includes an operation code, first address information associated with the TRIM operation, and second address information associated with a data copy operation for the valid data.

3. The method of claim 2, wherein:
    the first address information includes information of a TRIM sequential logical block address range that represents a target of the TRIM operation, and
    the information of the TRIM sequential logical block address range includes a start logical block address and a length of the TRIM sequential logical block address range.

4. The method of claim 2, wherein the second address information includes a source logical block address of the first storage region in which the valid data are stored and a destination logical block address of the second storage region to which the valid data are to be copied.

5. The method of claim 1, wherein internally copying the valid data into the second storage region includes reading valid pages from a first memory block to write the valid pages into a second memory block, the valid pages corresponding to the valid data, the first memory block corresponding to the first storage region, and the second memory block corresponding to the second storage region.

6. The method of claim 5, wherein the valid pages are directly copied from the first memory block into the second memory block without going through the external host.

7. The method of claim 1, wherein logical addresses and physical addresses of the valid data are changed in a unit of a memory block as a data copy operation for the valid data is performed.

8. The method of claim 1, wherein performing the TRIM operation includes:
    comparing information of a longest sequential logical block address range with information of a TRIM sequential logical block address range, the longest sequential logical block address range being pre-registered, and the TRIM sequential logical block address range representing a target of the TRIM operation; and
    in response to the longest sequential logical block address range being included in the TRIM sequential logical block address range, updating the logical-to-physical address mapping table and the valid page bitmap together.

9. The method of claim 8, wherein the logical-to-physical address mapping table and the valid page bitmap are updated in a batch based on a memory set (MEMSET) library operation or a direct memory access (DMA) operation.

10. The method of claim 8, wherein performing the TRIM operation further includes, in response to the longest sequential logical block address range not being included in the TRIM sequential logical block address range, updating the logical-to-physical address mapping table and the valid page bitmap in units of a bit or a byte.

11. The method of claim 8, further comprising registering the information of the longest sequential logical block address range during a data write operation.

12. The method of claim 11, wherein:
    the information of the longest sequential logical block address range includes a length, a start logical block address, and a start physical address of the longest sequential logical block address range, and
    the start physical address corresponds to the start logical block address.

13. The method of claim 11, wherein the information of the longest sequential logical block address range is managed for each of the plurality of memory blocks in a table.

14. The method of claim 1, wherein the storage device operates based on a multi-stream scheme in which a plurality of data written into the plurality of memory blocks are classified into a plurality of streams and data with a single stream are written into a single memory block.

15. The method of claim 1, further comprising performing a data erase operation on a first memory block corresponding to the first storage region.

16. A storage device comprising:
    a nonvolatile memory device including a plurality of memory blocks; and
    a storage controller that controls the nonvolatile memory device, wherein:

the storage controller receives a TRIM-after-COPY command from an external host such that a data compaction operation is performed on a first storage region, valid data stored in the first storage region are internally copied into a second storage region based on the TRIM-after-COPY command, and the storage controller performs a TRIM operation based on the TRIM-after-COPY command to update a logical-to-physical address mapping table and a valid page bitmap.

17. The storage device of claim 16, wherein:

the TRIM-after-COPY command includes an operation code, first address information associated with the TRIM operation, and second address information associated with a data copy operation for the valid data, the first address information includes a start logical block address and a length of a TRIM sequential logical block address range that represents a target of the TRIM operation, and the second address information includes a source logical block address of the first storage region in which the valid data are stored and a destination logical block address of the second storage region to which the valid data are to be copied.

18. The storage device of claim 16, wherein:

the storage controller compares information of a longest sequential logical block address range with information of a TRIM sequential logical block address range, the storage controller updates the logical-to-physical address mapping table and the valid page bitmap together in response to the longest sequential logical block address range being included in the TRIM sequential logical block address range, and the longest sequential logical block address range is pre-registered and the TRIM sequential logical block address range represents a target of the TRIM operation.

19. The storage device of claim 16, wherein the storage device is a solid-state drive (SSD), a multi-media card (MMC), an embedded multi-media card (eMMC), or a universal flash storage (UFS).

* * * * *